United States Patent [19]

Dugan et al.

[11] 3,949,226

[45] Apr. 6, 1976

[54] AUTOMATIC LIGHT INTENSITY CONTROLLER FOR CRT LIGHTHOUSE

[75] Inventors: James A. Dugan, Lake Forest; Yong S. Park, Hanover Park, both of Ill.

[73] Assignee: Zenith Radio Corporation, Chicago, Ill.

[22] Filed: May 26, 1972

[21] Appl. No.: 257,122

[52] U.S. Cl. ................. 250/354; 96/36.1; 250/205; 250/227; 250/239; 250/461

[51] Int. Cl.[2].. G01M 21/38; G01J 1/32; G03C 5/00

[58] Field of Search............ 96/36.1, 27 E; 250/103, 250/217 CR, 217 R, 214 P, 205, 83.3 UV, 239, 354, 461, 227; 95/1

[56] References Cited

UNITED STATES PATENTS

| | | | |
|---|---|---|---|
| 2,256,595 | 9/1941 | Metcalf | 250/227 |
| 2,817,276 | 12/1957 | Epstein et al. | 96/36.1 |
| 3,287,130 | 11/1966 | Kaplan | 96/36.1 |
| 3,294,901 | 12/1966 | Stanghi | 250/239 |
| 3,360,650 | 12/1967 | Lawrence | 250/83.3 UV |
| 3,521,067 | 7/1970 | Splain | 250/103 |
| 3,588,246 | 6/1971 | Georges | 250/214 P |
| 3,636,836 | 1/1972 | Maddox et al. | 95/1 |
| 3,685,994 | 8/1972 | Frey | 96/36.1 |

*Primary Examiner*—Harold A. Dixon
*Attorney, Agent, or Firm*—John H. Coult

[57] ABSTRACT

Apparatus for use in a lighthouse station for automatically maintaining the output of the light source at a predetermined level comprises a chamber for supporting a cathode ray tube face panel and a source of actinic energy located in the chamber. An adjustable controller is employed for energizing the source. A light translator in the form of a quartz rod is disposed adjacent the energy source for monitoring its output. A light responsive device, coupled to the light translator, derives a control signal representative of the instantaneous energy level of the light source. Finally, means responsive to the control signal serves to actuate the controller to maintain the output of the source at a predetermined level.

12 Claims, 4 Drawing Figures

FIG. 2A
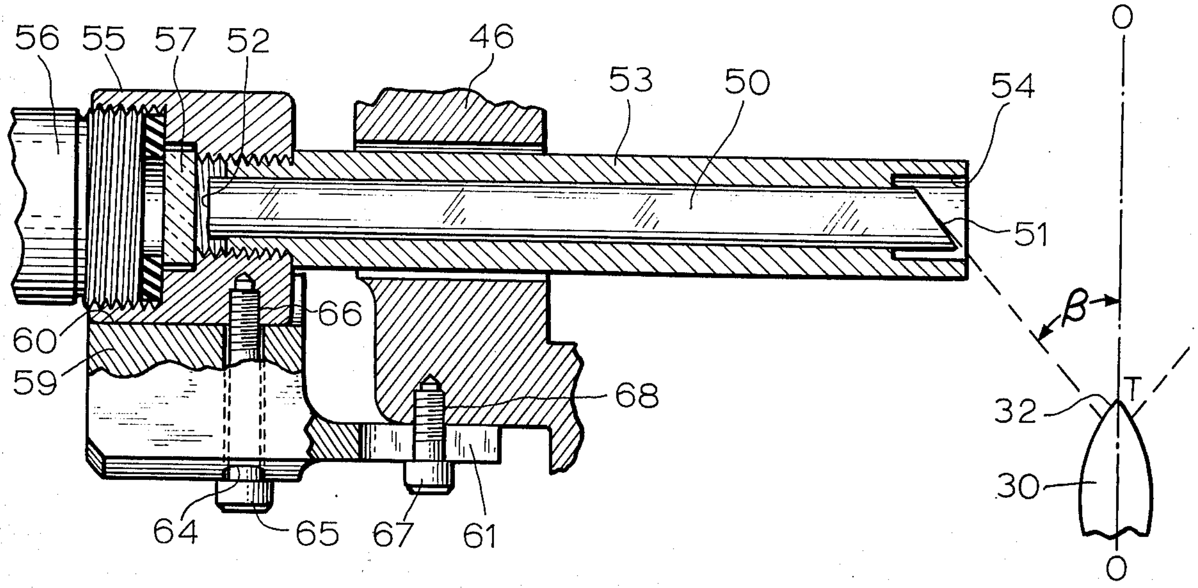
FIG. 3
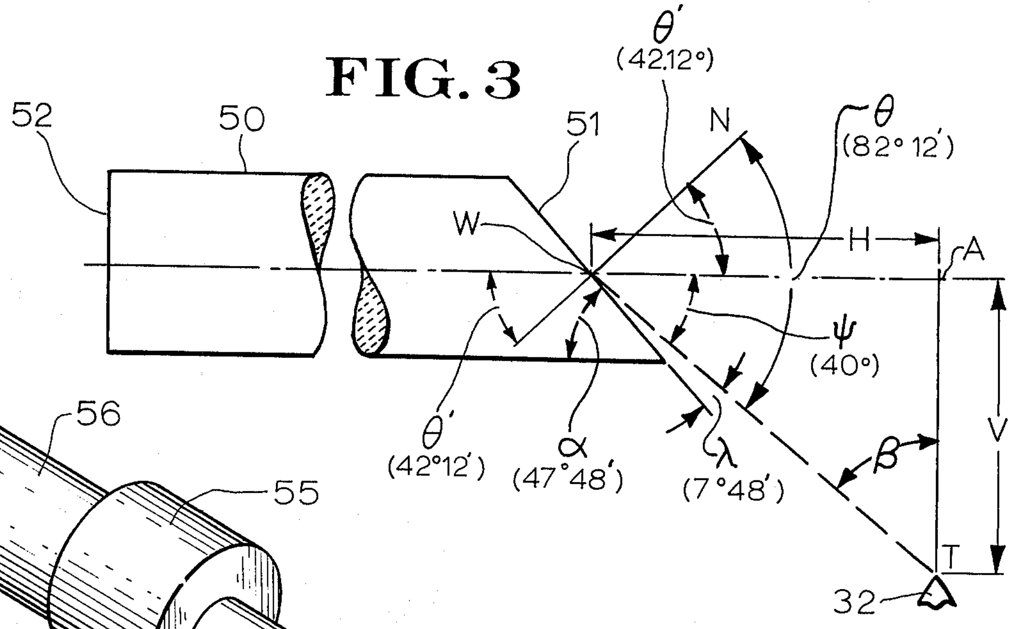
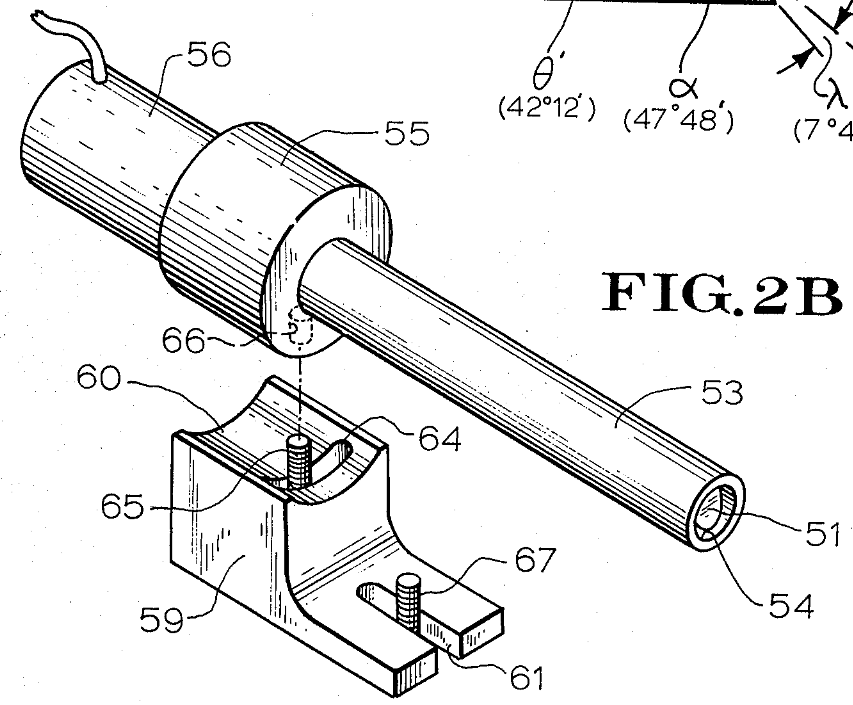
FIG. 2B

AUTOMATIC LIGHT INTENSITY CONTROLLER FOR CRT LIGHTHOUSE

BACKGROUND OF THE INVENTION

This invention relates in general to apparatus for manufacturing color cathode ray tubes and in particular to apparatus for automatically controlling the intensity of the light source employed for screening the face panel of a color picture tube.

In a conventional tri-color cathode ray tube the luminescent screen formed on the target surface of the face panel comprises a myriad of interleaved phosphor elements. Actually, the phosphor elements are relegated to one of three groups with all the phosphors in an assigned group selected to emit, upon excitation, one of the three primary colors, i.e., red, green or blue. In practice, all the elements of one color group are developed in one operation, which operation is then repeated for each of the other colors. The actual process by which these phosphors are applied to the face panel involves photographic techniques which are well known and understood in the art.

A new generation of color reproducing cathode ray tubes recently introduced utilizes a graded aperture mask in conjunction with a screen construction in which the phosphor elements are separated by deposits of a light absorbing material comprising a black pigment. A tube of this type is described in U.S. Pat. No. 3,146,368 which issued to Joseph P. Fiore et al. on Aug. 25, 1964. In view of this screen arrangement, such a tube has come to be designated a black-surround color tube.

It is extremely important in processing a black-surround picture tube that the openings in the black surround material not only be accurately dimensioned in accordance with a predetermined grade but also that the phosphor deposits within any triad be uniform across the target surface. To this end a process which facilitates achieving these requirements contemplates the following procedure. First, the target surface of the face panel is coated with clear *pva* (polyvinyl alcohol), a material which is rendered insoluble when exposed to light. This sensitized surface is then subjected to multiple exposures of actinic energy, either successively, or simultaneously, from sources having locations corresponding to the color centers subsequently used for exposing the color phosphors. The *pva* coated panel now registers a myriad of latent images corresponding to the positions to be occupied by the three groups of phosphor dots. The panel is then washed with water to remove the unexposed *pva* material, thus leaving a target surface comprised of a myriad of pva dots. The next step is to coat the entire surface of the target area with a graphite solution, for example, "Aquadag", a material available from Acheson Colloids of Port Huron, Mich. The coated panel is then heated to dry the Aquadag material. Then, the target surface of the panel is treated with a solution of peroxide which dissolves the *pva* dots. Since the Aquadag material is not soluble in peroxide only the *pva* dots are dissolved. The panel is washed again, this time to remove the dissolved *pva* so that the target surface of the panel now constitutes a black grille having a myriad of openings for receiving the red, green and blue phosphor materials.

The processing procedure above described must be closely monitored in order that the size and configuration of the *pva* dots be uniform. This precaution must be taken since these dots ultimately define the recesses in the black surround material that receive the phosphors. The dimensions of the *pva* dots are determined by the mask apertures, exposure time and also the intensity of the light impinging upon the *pva* coated target. Mask aperture size and exposure time are relatively easy to control. However, maintaining a constant level of light intensity from the actinic energy source is not so readily achieved because of the influence of such factors as line voltage, lighthouse lamp aging, etc. Accordingly, control of the intensity of the emanations from the light source is of particular concern where uniformity of the latent images is required, as is particularly the case presented in processing a black-surround type color picture tube.

It is therefore a general object of the invention to provide apparatus for accurately processing the light absorbing layer applied to the target surface of a black-surround type color picture tube.

It is a specific object of the invention to provide apparatus for automatically maintaining the output of a source of actinic energy at a predetermined level.

Apparatus for automatically maintaining, at a predetermined level, the output of a source of actinic energy employed for exposing a radiant energy sensitive coating deposited upon the target surface of a cathode ray tube face panel comprises a chamber for supporting the face panel and a source of actinic energy located in the chamber and disposed in a confronting relation to the target surface for irradiating the coating deposited thereon. The apparatus also comprises means, including an adjustable controller, for energizing the source. The light energy translating means is disposed adjacent the energy source, but outside the irradiation path between the source and the target surface, for monitoring the radiant energy output of the source. Means, coupled to the light energy translating means and responsive to the energy translated therethrough, derives a control signal representative of the instantaneous energy level of the energy source. Finally, means, responsive to the control signal, are provided for actuating the controller to maintain the output of the energy source at a predetermined level.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements and in which:

FIGS. 2A and 2B are detailed illustrations of a light translator associated with the lighthouse of FIG. 1; and FIG. 3 is a detail of the quartz translator shown in FIGS. 2A and 2B.

Figure 1:
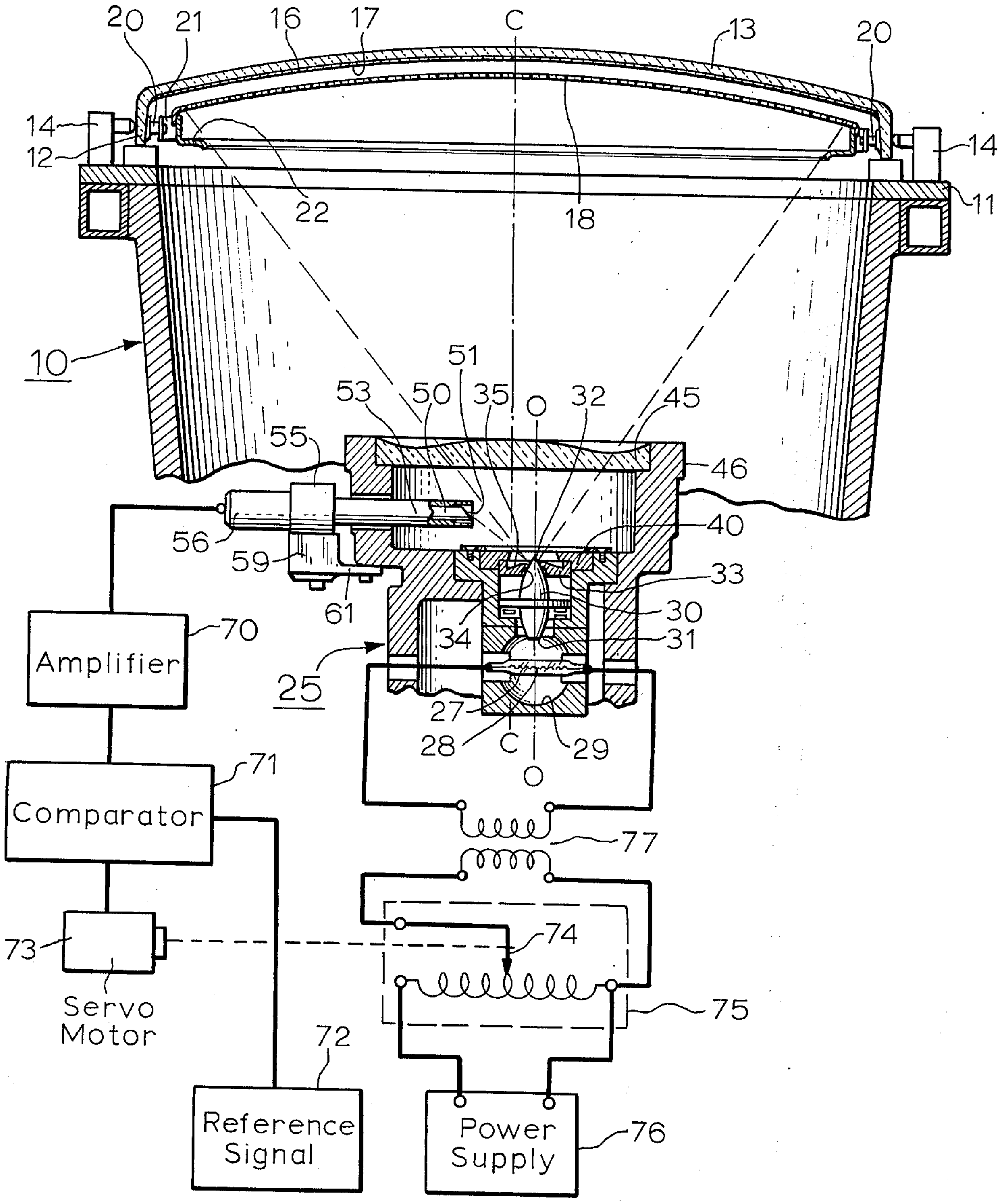
FIG. 1 is an elevational view, partly in section, of a cathode ray tube lighthouse station having a light intensity control arrangement constructed in accordance with the invention.

Referring now more paticularly to FIG. 1, the lighthouse arrangement there illustrated is of the type employed in fabricating a multicolor luminescent screeen for the face panel of a color reproducing cathode ray tube. As presently constructed, the envelope of such a tube comprises a face panel section, having the multicolor screen formed on the target surface thereof, and a funnel section, one end of which is dimensioned and shaped to conform to the free end or flange of the face panel. The face panel and funnel are eventually bonded together to form a unitary envelope. The end of the funnel opposite the face panel terminates in a narrow neck that receives and supports an electron beam generator, which usually takes the form of a trio of electron guns symmetrically located about the longitudinal axis of the tube. In keeping with the dictates of commercial practice the configuration of the panel section is rectangular, although it should be appreciated that the invention is also applicable to a tube having a round faceplate. In any event, a multicolor screen is formed on the inner or target surface of the face panel before the panel and funnel sections are assembled. Since the present invention is directed solely to apparatus employed in the screening operation, no further consideration will be given to the other processing steps employed in fabricating a color picture tube.

It will also be convenient for the following discussion to assume that the tube is of the dot triad type so that the black-surround material will ultimately comprise a myriad of apertures for receiving the three groups of phosphor dots. Each group of apertures is formed by the same method except that only one such group is formed in any one processing cycle. Moreover, while the position for the light source is different for each of the three exposures, the function of the lighthouse apparatus is the same irrespective of the aperture group being fabricated; therefore, insofar as the subject invention is concerned, it is sufficient to consider only one exposure process without any concern for the particular phosphor ultimately assigned thereto.

Accordingly, the lighthouse of Figure 1 comprises an exposure chamber 10 which is represented in a simplified schematic form that omits the cooling, adjusting and indexing mechanisms which are of no concern to the present invention. Except for having an open top, chamber 10 is substantially enclosed on all sides. A shelf 11, which is formed about the top of the enclosure, receives the peripheral flange 12 of the face panel section 13 of a color reproducing cathode ray to support that panel substantially transversely of the reference axis C—C of chamber 10 and with its center coincident with that axis. A set of fixtures (only two shown) 14, is attached to shelf 11 and engages the outer walls of flange 12 to facilitate rapid and accurate indexing of panel 13 relative to the axis of an optical system enclosed in chamber 10, which system is detailed below.

The face panel comprises an inner target surface 16 upon which a photosensitive coating 17, for example, polyvinyl alcohol, has previously been deposited. A color selection electrode 18, in the form of a metal mask having transparent and opaque portions that collectively define the exposure pattern desired for application to coating 17, is supported in a substantially parallel spaced and confronting relation to target surface 16 of the face panel. The manner of supporting mask 18 is of no particular concern so long as it is firmly retained within the face panel in a demountable fashion. To this end it is a common practice to provide the inside wall of face panel flange 12 with three studs 20 (only two shown) which individually receive one of three mounting springs 21 secured to a frame member 22 that circumscribes mask 18.

In order to expose coating 17, an optical system 25 is mounted in the lighthouse. This system comprises a primary light source usually in the form of a linear mercury lamp 27 having an energizing filament 28. A spherical reflector 29 is positioned about lamp 27. System 25 further includes a virtual light source comprising a collimator 30 through which the optical axis 0—0 of system 25 extends. As shown in FIG. 1, the optical axis of the collimator is located offset but substantially parallel to the reference axis C—C of the chamber. The collimator which conveniently assumes the shape of a bullet, has at one end a light gathering surface 31 in registration with lamp 27, and a light emitting tip 32 at the opposite end. Tip 32 effectively constitutes a point source of light and its location corresponds to the center of deflection of that electron beam which the light source is intended to simulate during the photographic exposure process. Generally the center of deflection is located near the center of the deflection yoke that is designed for use with the completed tube. Actually, there are three centers of deflection, one for each of the primary colors and these centers are spaced approximately 120° apart. In short, the position of the light source and its spacing from target surface 16 for any of the three exposure steps are well defined in terms of the center of deflection and in a manner thoroughly understood in the art.

Surrounding collimator 30 is a light stop 33 which confines the light rays "seen" by the target to collimator tip 32. More particularly, stop 33 is provided with an aperture 34 through which emitter tip 32 protrudes. Stop 33 comprises a substantially circular member while its aperture 34 is chamfered to receive the tapered emitter tip of the collimator. The upper surface of stop 33 is relieved in such a fashion as to form a gently tapering mutilated cone 35. The details of stop 33 are described in copending application Ser. No. 248,845 filed May 1, 1972 in the names of Yong S. Park and Raymond J. Pekosh, which application is assigned to the same assignee as the present invention.

Interposed between the collimator and the aperture mask is a lens 45 which constitutes an optical device for correcting misregistration errors. A lens of this type is described in U.S. Pat. No. 3,003,874 which issued to Sam H. Kaplan on Oct. 10, 1961 and is assigned to the same assignee as the present invention. Lens 45 is supported transversely of reference axis C—C by means of a collar 46 which is apertured sufficiently so as to not adversely interfere with the optical system.

Extending into housing 46 is a light energy translator in the form of an elongated quartz rod having a sloping entrance window 51 at one end tht confronts emitter tip 32 of the collimator. The opposite extremity of rod 50 comprises an exit port 52. Rod 50 is fixedly secured within a hollow tube 53 having a reentrant sleeve portion 54 immediately surrounding window 51 of the rod, see FIG. 2A. The function of sleeve 54 is two-fold; first, it permits ready access for cleaning the entire surface of window 51 without removing the rod from tube 53 and, secondly, it prevents light reflected from the sloping surface of window 51 from impinging upon the target surface 17 of the face panel.

One end of tube 53 is threaded in order that it may be readily inserted into one end of a substantially cylindrical mounting base 55. Secured to the opposite end of base 55 is a light responsive device which can take the form of a photodiode 56. An ultraviolet transmitting optical filter 57 is interposed between diode 56 and exit window 52 of rod 50. Mounting base 55 is rotatably nested in a support pedestal 59 which comprises a saddle portion 60 for receiving base 55 and a slotted bracket 61. To facilitate adjustment of rod 50, saddle 60 is provided with an arcuate slot 64 for admitting an adjusting screw 65 which, in turn, is received in a threaded aperture 66 of base 55. This arrangement permits rotational adjustment of entrance window 51 relative to the collimator in order to secure the optimum angular relationship between a light ray TW from the collimator tip incident upon the center of window 51. This relationship is achieved when the tip of the collimator appears in the center of window 51 when one sights down the axis of rod 50 from the exit port 52. A second adjusting screw 67, passing through the slotted portion of bracket 61 is received in a tapped hole 68 in the wall of lighthouse housing 46. With this latter arrangement, the support pedestal and rod 50 can be moved normal to the optical axis of the collimator in order to select the optimum position for the light rod in this direction. Quartz rod 50 is preferably located normal to the longer dimension of the faceplate. This arrangement is adopted in order to permit the window of the light rod to approach the collimator as closely as possible without protruding into the irradiation path between the collimator and the target surface of the face panel while still maintaining a minimum angular relationship $\beta$ between a light ray TW emanating from the collimator and a vertical TA through the collimator.

Referring to the detailed drawing of FIG. 3, wherein the relationship between the slope of window 51 and the collimator tip is depicted, the design factors governing this relationship will now be discussed. As shown in this drawing, the center of window 51 has an unobstructed "view" of the collimator tip via light ray TW. This condition must be satisfied if maximum light energy is to be translated to the photodiode. That this is so can be appreciated by noting that if rod 50 is moved toward the optical axis of the collimator, light rays emitted from the tip approach a condition of parallelism to window 51 and then, as the window moves closer to that axis, the rays will strike the under side of the rod. Obviously, once the rod moves past the position where the light rays parallel the window, substantially no light is translated to the photodiode.

On the other hand, if the rod is withdrawn the light rays from the center of the collimator tip will not be concentrated on the center of window 51. As a result, due to the refractive index of the quartz, the light rays will follow multiple reflective paths through the rod to exit pot 52, thus reducing transmission efficiency for the captured light.

The position of the quartz rod relative to the collimator is determined, in part, by the geometry of the lighthouse; in other words, the physical space available for the rod. Another consideration is the irradiation path between the collimator tip and the face panel since, as previously noted, the rod must not extend into that path. Accordingly, with these two considerations in mind, the lateral distance H from the optical axis to the rod window 51 is selected to insure that the window does not intrude into the aforementioned irradiation path. By way of example, in an actual embodiment of the invention for a particular lighthouse construction this distance was determined to be 2.308 inches. A value of 40° was then selected for the angle $\psi$. This, in turn, dictated a value of 50° for $\beta$. With these parameters established, the vertical distance V from the collimator tip to the axis of the quartz rod is calculated to be 1.94 inches, that is, 2.308 inches × tan 40°.

The proper angle for window 51 relative to the collimator tip, is now calculated by resort to Snell's law of refraction which states that a refracted ray lies in the plane of incidence, and the sine of the angle of refraction bears a constant ratio to the sine of the angle of incidence. This law is mathematically defined by the following equation:

$$n \sin \theta = n' \sin \theta'$$

wherein $n$ is the index of refraction of air, $n'$ is the index of refraction of the quartz rod, $\theta$ is the angle of incidence of a light ray and $\theta'$ is the angle defined by the refracted light ray relative to a normal N to the window surface at the point of incidence. In an actual embodiment of the invention rod 50 was formed of 10 mm non-solarizing fused silica type 1 quartz having an index of refraction of 1.475. Having already selected the value for $\psi$ to be 40°, the following mathematical development provides the value of the $\theta'$, that is, the angle of the defracted light wave in the quartz rod relative to the normal N:

$$n' \sin \theta' = n \sin \theta$$

$$n' \sin \theta' = n \sin (\psi + \theta')$$

$$n' \sin \theta' = \sin \psi \cos \theta' + \cos \psi \sin \theta'$$

$$n' = \sin \psi \cot \theta' + \cos \psi$$

$$-\sin \psi \cot \theta' = -n' + \cos \psi$$

$$\cot \theta' = \frac{n' - \cos \psi}{\sin \psi}$$

$$\theta' = \cot^{-1} \left[ \frac{n' - \cos \psi}{\sin \psi} \right]$$

Knowing the value of $\psi$ to be 40°, solving the above equation gives a value of 42°, 12' for $\theta'$. The next parameter to be determined is the value of the angle $\alpha$; that is, the slope of window 51. Referring to FIG. 2 it is obvious from geometrical considerations that:

$$\alpha = 90° - \theta' = 90° - 42° \, 12' = 47° \, 48'.$$

The remaining angle shown in Figure 3 is $\lambda$, the acute angle subtended by the surface of window 51 and a light ray TW extending from the effective center of the collimator tip to the center of window 51. Given the values shown in Figure 3, $\lambda$ assumes a value of 7° 48'.

Accordingly, it has been shown that after taking the geometry of the lighthouse into consideration the optimum position for the quartz rod can be developed through geometrical procedures. The slope of window 51 is of prime importance since, the path of refracted light wave must traverse the cener of the quartz rod in order that the most efficient translation of captured light be realized.

The intensity of the light emitted by the collimator is determined by the temperature of the heating element employed in the mercury lamp 27. Even a small change in filament voltage causes a significant change in the intensity of the light output from the lamp. Accordingly, it is extremely important that this filament voltage be maintained subtantially constant. It is to this end that the disclosed light monitoring arrangement is addressed. More particularly, the output of photodiode 56 is applied to an amplifier 70 and from thence to a comparator circuit 71 which compares the diode output to a signal furnished by a reference source 72 and then develops a control signal. The control signal is then applied to an electric servo motor 73, the output shaft of which is mechanically coupled to the control arm 74 of a variac 75. The input terminals of the variac are coupled across a power supply 76 while its output terminals are connected across the primary of a filament transformer 77. The secondary of transformer 77 is connected across the filament 28 of the mercury lamp. Accordingly, as the light output of the collimator tip attempts to change, the variation in light output from photodiode 56, in the form of an electrical signal, is communicated to comparator 71 via amplifier 70 wherein it is compared to the reference signal to derive a control signal. This signal commands the servo motor 73 to assume a new position and thereby adjust the control arm 74 of the variac in such a manner as to compensate for the variation in light output detected by the comparator. In this fashion the above-described light monitoring system reacts instantaneously to raise or lower the filament voltage to offset the change in light output, thereby maintaining a constant light intensity for irradiating the target surface on the face panel.

While the invention has been disclosed as having particular application to the processing of the light absorbing coating in a black-surround type color picture tube, it is appreciated that the invention is also applicable to the processing of the color phosphors or, for that matter, any other process in which automatic control of a source of actinic energy is desired or necessary.

While particular embodiments of the invention have been shown and described, modifications may be made, and it is intended in the appended claims to cover all such modifications as may fall within the true spirit and scope of the invention.

We claim:

1. In a lighthouse station employed for exposing an actinic energy sensitive coating deposited upon the target surface of a cathode ray tube face panel, apparatus for automatically maintaining the output of a source of actinic energy at a predetermined level, said apparatus comprising:

a chamber for supporting said face panel;

a source of actinic energy located in said chamber and disposed in a confronting relation to said target surface for irradiating the coating deposited thereon;

means, includng an adjustable controller, for energizing, said source;

light energy translating means disposed adjacent said energy source, substantially between said source and said target surface but outside the path of irradiation from said source to said target surface;

means coupled to said light energy translating means and responsive to the energy translated therethrough for deriving a control signal representative of the instantaneous energy level of said source;

and means responsive to said control signal for actuating said controller to maintain the output of said energy source at said predetermined level.

2. Apparatus as set forth in claim 1 in which said light energy translating means comprises a quartz rod.

3. Apparatus as set forth in claim 1 in which said means for deriving said control signal comprises a photocell.

4. Apparatus as set forth in claim 2 in which said source of actinic energy includes a collimator and said quartz rod includes an entrance window disposed in a confronting relation to said collimator and an exit window in registration with said means for deriving said control signal.

5. Apparatus as set forth in claim 4 which further includes an ultraviolet filter interposed between the exit wndow of said rod and said means for deriving said control signal.

6. Apparatus as set forth in claim 4 which further includes means for adjustably positioning the entrance window of said quartz rod relative to said collimator to obtain maximum control signal response.

7. Apparatus in accordance with claim 1 wherein said light energy translating means has a light gathering end located at the edge of the light energy field irradiating said target surface.

8. Apparatus as defined in claim 7 wherein said panel is generally rectangular, possessing major and minor axes, said light energy translating means being further located substantially in a plane containing said minor axis and perpendicular to said major axis.

9. In a lighthouse of the type for exposing photosensitive materials on the target surface of a cathode ray tube face panel, the lighthouse including a facepanel supporting chamber wherein a source of radiation actinic to said photosensitive materials is disposed in a confronting relation to the target surface for irradiating the photosensitive coating thereon and a lens interposed between said source and said panel for correcting misregistration errors, apparatus for automatically monitoring and controlling the radiation source such that the source output remains constant, said apparatus comprising:

adjustable source energizing means; and a feedback loop coupled between said source and said source energizing means for maintaining said source output at a predetermined level, said feedback loop comprising:

photoresponsive means having an effective radiation-receiving surface located substantially between said source and said target surface but immediately outside the path of irradiation from said source to said target surface; and means coupled between said photoresponsive means and said energizing means for maintaining the output of said energy source at said predetermined level.

10. Apparatus as defined in claim 9 wherein said panel is generally rectangular, possessing major and minor axes, said radiation receiving surface being further located substantially in a plane containing said minor axis and perpendicular to said major axis.

11. Apparatus as defined in claim 10 wherein said radiation receiving surface is located between said source and said lens.

12. Apparatus as defined in claim 11 wherein said radiation receiving surface is located adjacent said energy source.

* * * * *

Disclaimer and Dedication 3,949,226.—*James A. Dugan*, Lake Forest, and *Yong S. Park*, Hanover Park, Ill. AUTOMATIC LIGHT INTENSITY CONTROLLER FOR CRT LIGHTHOUSE. Patent dated Apr. 6, 1976. Disclaimer and dedication filed June 1, 1976, by the assignee, *Zenith Radio Corporation*.

Hereby disclaims and dedicates to the Public claims 1, 3, and 7–12 of said patent.

[*Official Gazette July 27, 1976.*]